Patented July 8, 1924.

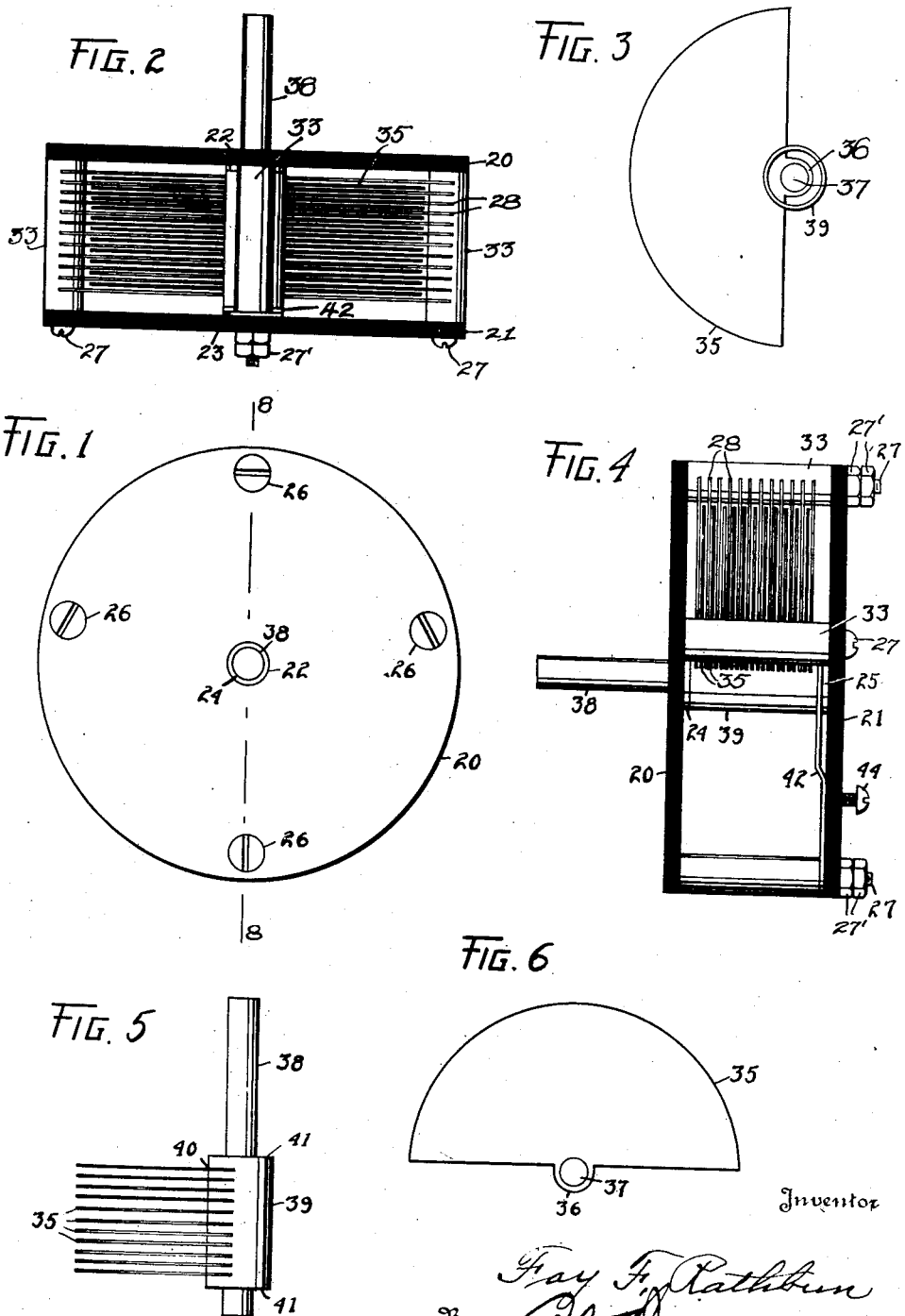

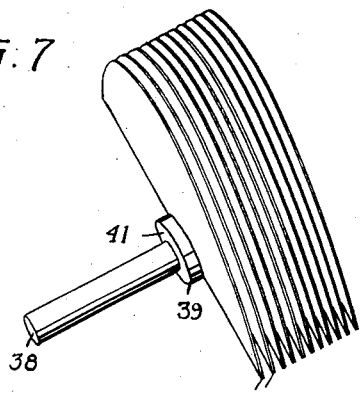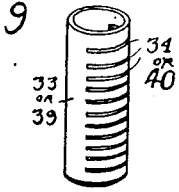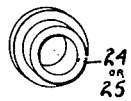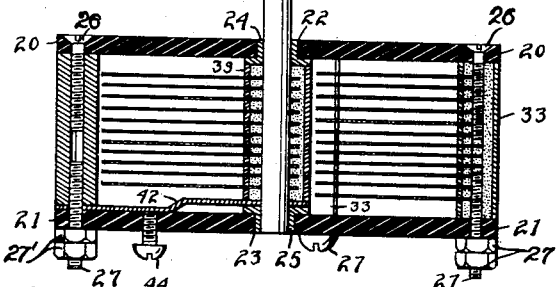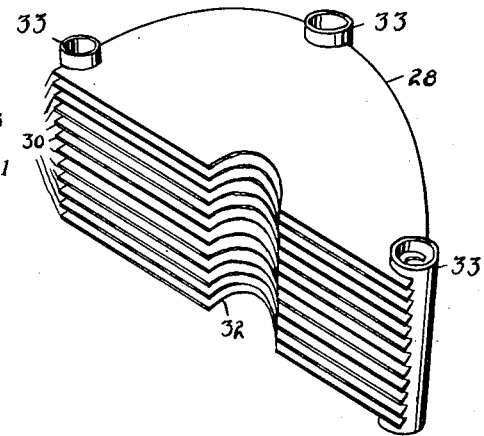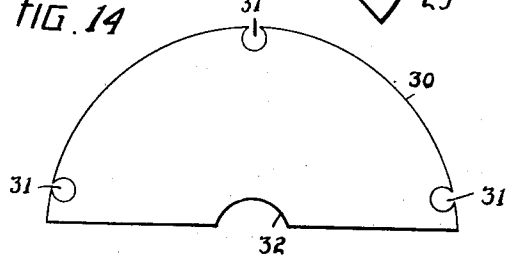

1,500,528

UNITED STATES PATENT OFFICE.

FAY F. RATHBUN, OF JAMESTOWN, NEW YORK.

VARIABLE ELECTRIC PLATE CONDENSER.

Application filed July 7, 1922. Serial No. 573,370.

*To all whom it may concern:*

Be it known that I, FAY F. RATHBUN, a citizen of the United States, residing at the city of Jamestown, in the county of Chautauqua and State of New York, have invented certain new and useful Improvements in Variable Electric Plate Condensers, of which the following is a specification.

This invention relates to certain new and useful improvements in Variable Electric Condensers, and the primary object thereof is to provide a multiple plate condenser in which the two sets of plates are secured in position by improved means, which effects strong, rigid and efficient holding of the plates.

A further object of the invention is to provide a construction wherein the plates are not only held rigidly and accurately in their predetermined positions, but also one which enables economical production.

A still further object of the invention is to provide securing means for the plates which function in a dual capacity, i. e., first to secure the plates in their assembled relation, and second to provide positive electric connections between the various plates of both the stationary and movable sets.

The invention still further aims to provide connecting means for the plates which requires but a single molten metal pouring operation to effect connection of all of the plates and has still further and other objects which will be later set forth and manifested in the course of the following description.

In the drawings, Figure 1 is a top plan view of the condenser;

Figure 2, is a front elevation;

Figure 3, is a top plan view of one of the movable sets of plates inserted in the central tube before securement;

Figure 4, is a side elevation showing the two sets of plates in the full capacity position thereof;

Figure 5, is a side elevation of the movable set of the plates removed from the condenser;

Figure 6, is a top plan view of one of the plates of the movable set;

Figure 7, is a perspective view of the movable set of plates as shown in side elevation in Figure 5;

Figure 8, is a section on line 8—8 of Figure 1; the movable set of plates being shown entirely out of the field of the stationary set of plates;

Figure 9, is a perspective view of one of the tubes for the stationary set of plates or the central tube for the movable set of plates;

Figure 10, is a top plan view of the tension or contact spring;

Figure 11, is a detail perspective view of one of the bearing bushings for the central movable set of plates;

Figure 12 is a top plan view of an assembled set of stationary plates before being fixed in position by the molten metal and a movable set of plates placed in relation thereto;

Figure 13 is a perspective view of the stationary set of plates as assembled in the tubes already for securement by the injection of the molten metal; and Figure 14, is a top plan view of one of the stationary plates.

The condenser consists of the top insulation plate 20 and bottom insulation plate 21, which plates have central openings, opening 22 being formed in the top plate and opening 23 in the bottom plate.

The openings 22 and 23 receive the bushings 24 and 25 respectively therein, suitable openings being provided for the assembling screws 26 in the top plate 20 and screws 27 in the bottom plate 21, two of which screws 27 preferably form screw contact studs and have nuts 27' thereon, for attaching the contact wire connections; the screws 26 and 27 clamping the stationary set of plates 28 and the movable set of plates 29 between the top and bottom insulation plates 20 and 21.

The stationary set of plates 28, consists of a plurality of separately formed semi-circular shaped plates 30 which have holes 31 extending through the curved edges of the plates and semi-circular openings 32, struck therein by means of suitable dies which shape the plates. The plates 28 are held in spaced relation by means of tubular posts 33, preferably three in number, corresponding to the three holes 31 in the peripheral edges of the plates 30, the tubular openings in the posts 33 being of greater diameter than that of the holes or openings 31.

The tubular posts 33 have spaced, milled or sawed slots or cuts 34 extending about half way through one side of the same, which cuts are of such width relative to the thickness of the plates 30, so that the plates 30 are insertable therein with a close frictional fit in assembling the plates in the posts 33.

The plates with the tubular posts 33 related thereto as shown in Figures 12 and 13, are assembled in a suitable jig. Core rods are next inserted in the posts 33, whereupon the assembled structure is placed in a die casting machine the molten metal being poured into and filling the tubular posts 33 in the space between the core rods and the post interiors, thereby firmly anchoring the plates 28, when the metal cools. Upon withdrawal of the core rods, a tubular opening is provided through the filled posts 33 for the insertion of the assembling screws 26 and screw studs 27.

The movable set of plates 29 consists of the separately formed semi circular plates 35 having lugs 36 central of the diametral side edge of the same, with holes 37 in the lugs for the insertion of a vertical shaft 38. A central tubular post 39 is provided which is constructed exactly the same as in the instance of the tubular post 33, except that it is preferably larger in diameter, and has the slots or cuts 40 therein so placed in relation to the length of said tube 39 that they centrally alternate the spaced plates 28 in the tubes 33 when assembled, that is, there is one less movable plate 35 than there are stationary plates 28 so that when assembled in the condenser and adjusted in intermediate spaced relation, the plates 35 are accurately centered between the similarly spaced stationary plates 28.

It is apparent that when the plates 35 of the movable set 29 are assembled in a suitable jig, in position in the cuts 40 in the tube 39 as shown in endwise view in Figure 3, the assembled shaft 38, tube 39 and plates 35 are placed in a suitable die casting machine, and the molten metal forced into the tube 39, filling the same and anchoring the plates 35 and shaft 38 within the tube 39, thereby also providing the shoulders 41 at the opposite ends of the tube 39, which bear against the bushing 24 at the upper end and against a tension spring 42 at the lower end.

The tension spring 42 bears against the inner face of the bushing 25, a hole 43 being provided in the tension spring 42 to receive the lower end of the shaft 38, the spring being attached at its outer end by means of the screw 27 as shown in Figure 8. A tension adjusting screw 44 is provided for the tension spring 42 in the bottom insulation plate 21, thereby permitting the obtainance of any desired tension upon the rotatably mounted movable set of plates 29.

It is obvious that the parts of this simple variable type electrical condenser can be struck out at low cost and assembled with great accuracy and rapidity, thereby providing a strong and durable condenser at low cost.

What is claimed is:

1. In an electric condenser, a series of spaced plates, a tubular element having lateral spaced slots to receive portions of the respective plates and to allow said portions to project within the interior of the member, said portions being spaced in part from the inner wall of the tubular member so as to allow binding means to flow from one end to the other of the tubular member, and meltable binding means in the interior of the tubular member filling the spaces between said portions of the plates and the inner wall of the tubular member.

2. In an electric condenser, a series of spaced plates, a tubular member having a series of lateral slots to receive portions of the respective plates to allow such portions to project within the interior of the member, and a meltable binding means in the interior of the tube filling the spaces between the said portions of the plates and surrounding such portions.

3. In an electric condenser, a series of spaced plates, a tubular member having a series of lateral slots to receive portions of the respective plates to allow such portions to project within the interior of the member, said portions being provided with alined holes, a shaft extending through the holes, and a fusible binding means in said tubular member filling all of the spaces between the shaft, the interior of the member and said portions of the plates which extend into the member.

4. In an electric condenser, a tubular member having spaced slots, a series of plates having apertured parts projecting into the respective slots, a fusible filler in the interior of the tubular member having a central bore extending therethrough, and means in the bore for securing the tubular member in position.

5. In an electric condenser, a top and a bottom plate, a central tubular member and peripheral tubular members interposed between said plates, each of the members being transversely slotted at spaced intervals, a series of spaced plates for the central member and a series of spaced plates for the peripheral members with the plates of the two series arranged to be received within the spaces between the respective plates, each plate having a part extending within the interiors of the respective members, a meltable binding element in each member to connect said parts of the plates thereto, the binding element of each of the members having a bore, a shaft extending through the bore of the central member, and fastenings extending in to the bores of the peripheral members for connecting the top and bottom plates to the peripheral members.

6. In an electric condenser, a tubular member having transverse spaced slots, a series of plates having parts disposed in the respective slots, and a meltable filler in the member having a part extending throughout the portion of the member occupied by the plates and having other parts occupying the spaces between and disposed about the parts of the plates within said member.

In testimony whereof I have affixed my signature.

FAY F. RATHBUN.

Witnesses:
 THEO. THOMAS HAAG,
 CORINNE V. SWANSON.